(12) United States Patent
Kilpatrick et al.

(10) Patent No.: US 9,747,323 B1
(45) Date of Patent: Aug. 29, 2017

(54) METHOD FOR RECONSTRUCTION OF A DISTRIBUTED LOCK STATE AFTER A NODE ADDITION OR REMOVAL USING A CONSISTENT HASH

(71) Applicant: EMC Corporation, Hopkinton, MA (US)

(72) Inventors: Douglas Kilpatrick, Seattle, WA (US); Suraj Brahma Raju, Bellevue, WA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 305 days.

(21) Appl. No.: 14/586,053

(22) Filed: Dec. 30, 2014

(51) Int. Cl.
*G06F 17/00* (2006.01)
*G06F 17/30* (2006.01)

(52) U.S. Cl.
CPC .. *G06F 17/30362* (2013.01); *G06F 17/30097* (2013.01)

(58) Field of Classification Search
USPC ................................................ 707/704, 783
See application file for complete search history.

(56) References Cited

U.S. PATENT DOCUMENTS

| 5,940,841 | A | * | 8/1999 | Schmuck | ............ G06F 11/1435 |
| 5,946,686 | A | * | 8/1999 | Schmuck | .......... G06F 17/30224 |
| | | | | | 707/783 |
| 6,920,454 | B1 | * | 7/2005 | Chan | ..................... G06F 9/5061 |

* cited by examiner

*Primary Examiner* — Hung T Vy
(74) *Attorney, Agent, or Firm* — Krishnendu Gupta

(57) ABSTRACT

Implementations are provided herein for an efficient reconstruction of distributed lock states during a group change within a distributed file system. When a node leaves or joins the cluster, a consistent hash can be used in reassigning the coordinator node to all the distributed locks throughout the file system. Through the use of the consistent hash, wherever possible, nodes that exist both prior to and after the group change can maintain their coordinator status for the locks they manage. If the node is aware they are maintaining coordinator status for the locks it manages, it can retain the locking status previously associated with the locks it was coordinating prior to the group change, thus reducing necessary backplane communication from a coordinator change, and increasing the efficiency for the group change process.

15 Claims, 6 Drawing Sheets

| RESOURCE ALLOCATION OF CLUSTER PRIOR TO GROUP CHANGE | | | |
|---|---|---|---|
| NODE 1 | NODE 2 | NODE 3 | NODE 4 |

FIG. 2A

| RESOURCE ALLOCATION OF CLUSTER AFTER ADDING A NODE | | | | |
|---|---|---|---|---|
| NODE 1 | NODE 2 | NODE 3 | NODE 4 | NODE 5 |

FIG. 2B

| RESOURCE ALLOCATION OF CLUSTER AFTER NODE FAILURE | | |
|---|---|---|
| NODE 1 | NODE 2 | NODE 4 |

FIG. 2C

METHOD FOR RECONSTRUCTION OF A DISTRIBUTED LOCK STATE AFTER A NODE ADDITION OR REMOVAL USING A CONSISTENT HASH

FIELD OF THE INVENTION

This invention relates generally to processing data, and more particularly to systems and methods for reconstructing a distributed lock state of a cluster of nodes using a consistent hash after an addition of nodes or removal of nodes.

BACKGROUND OF THE INVENTION

Distributed file systems offer many compelling advantages in establishing high performance computing environments. One example is the ability to easily expand, even at large scale. In some distributed file systems, specifically those that use distributed locking of files and metadata structures to process operations, each node may coordinate a small subset of the overall number of locks on the cluster of nodes. If one node then wishes to assert a lock on a file or structure that is coordinated by another node, the node must send a communication packet to the coordinator node that asks for the lock to be established and then receive confirmation from the coordinator when the request been granted. It can be appreciated that in large scale distributed file systems, that the number of locks that are managed in this manner can reach tens to hundreds of million or more depending on the scale of the distributed system.

When a node or group of nodes is added to a cluster of nodes, or when a node or nodes is removed from a cluster of nodes, the resources of the cluster can change dramatically. In the event where a node leaves the cluster, any locks that were previously coordinated by that node must be redistributed. In one example, the locks can be redistributed by a coordinator node assigned among the surviving nodes. It can be appreciated, however, that in many distributed file systems coordinators are not assigned deterministically. When a node has become the new coordinator for a lock or a group of locks, at first, it will have minimal knowledge about which other nodes, e.g. initiator nodes, have locks asserted on the structures the coordinator node is now coordinating. Thus, the coordinator must either ask for or wait passively for and then receive, updates from all initiators nodes that effectively reassert their locks. With potentially millions of locks to assert, the amount of backplane communication among the cluster can be substantial. It can be further appreciated that the during the lock reconstruction process after a group change, the entire distributed file system is locked down until the group change process is complete, suspending any pending operations and likely penalizing performance to any clients connected to the distributed file system. Thus there exists a need to make the group change process more efficient to reduce any downtime by the distributed file system during a group change.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its sole purpose is to present some concepts of the specification in a simplified form as a prelude to the more detailed description that is presented in this disclosure.

In accordance with an aspect, a set of locks among a cluster of nodes can be identified, wherein a lock among the set of locks is associated with a coordinator node among the cluster of nodes. A group change among the cluster of nodes can be determined, wherein the group change indicates at least one of at least one new node among the cluster of nodes or at least one missing node among the cluster of nodes. An API lock can be established on the cluster of nodes, wherein the API lock is a node local lock and wherein the API lock blocks all new lock operations. A set of messages can be waited on to process, wherein the set of messages were established prior to establishing the API lock. Waiting operations can be canceled, wherein waiting operations are operations that are waiting on a lock request. A consistent hash can be used to associated a new coordinator node among the cluster of nodes for locks among the set of locks, wherein the consistent hash maximizes the odds that the new coordinator node for locks among the set of locks is the same as the coordinator node for locks among the set of locks prior to determining the group change. In response to a new coordinator node for locks among the set of locks matching the coordinator node for locks among the set of locks prior to determining the group change, the lock data previously maintained by the coordinator node can be retained.

In another aspect, in response to a new coordinator node for a lock among the set of locks being different than the coordinator node for the lock, initiator nodes among the cluster of nodes can reassert locking information associated with the lock to the new coordinator node.

The following description and the drawings set forth certain illustrative aspects of the specification. These aspects are indicative, however, of but a few of the various ways in which the principles of the specification may be employed. Other advantages and novel features of the specification will become apparent from the detailed description of the specification when considered in conjunction with the drawings.

BRIEF DESCRIPTION OF THE DRAWINGS

FIGS. 2A-2C illustrate example bar graphs of cluster resources associated with a cluster of nodes before and after a group change in accordance with implementations of this disclosure;

DETAILED DESCRIPTION

Figure 1:
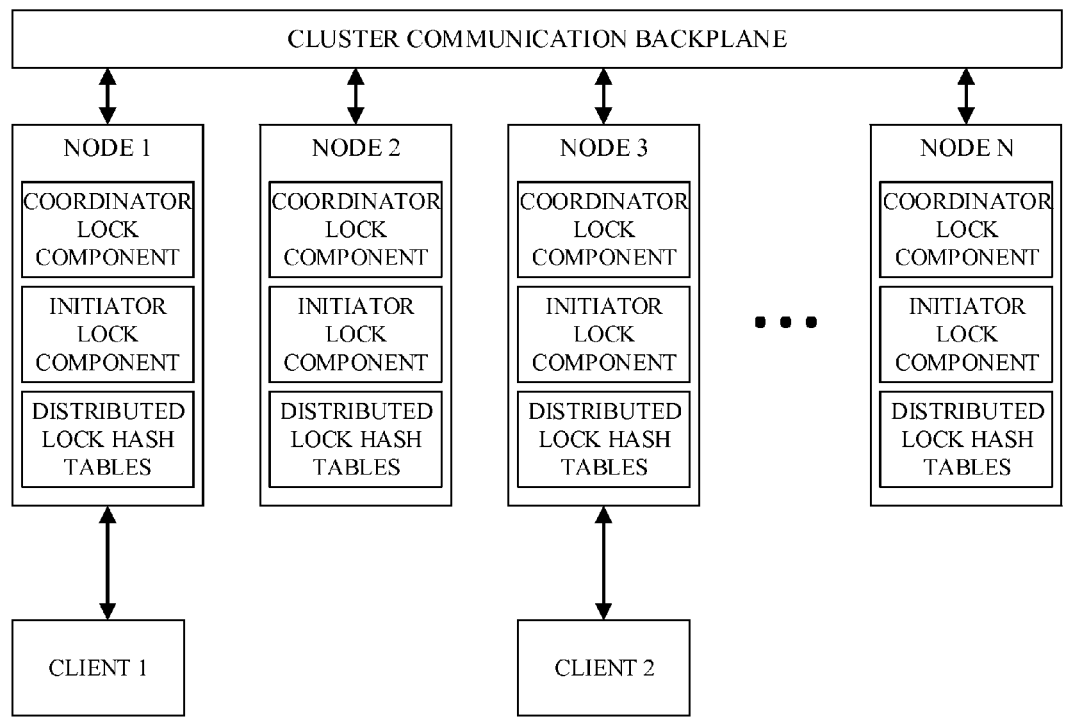
FIG. 1 illustrates an example of a cluster of nodes and associated clients in accordance with implementations of this disclosure.

The innovation is now described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and devices are shown in block diagram form in order to facilitate describing the innovation.

The term "inode" or "logical inode" ("LIN") as used herein refers to in-memory representation of on-disk data structures that may store information, or meta-data, about files and directories, such as file size, file ownership, access mode (read, write, execute permissions), time and date of creation and modification, file types, data protection process information, etc. In one implementation, LIN's may be in a known location in a file system, for example, residing in cache memory for fast and/or efficient access by the file system. Before or in conjunction with performing a file system operation on a file or directory, the system call may access the contents of the LIN and/or the contents of the file in determining how to process the system call. In some implementations, a data structure explicitly named "inode" or LIN may be absent, but file systems may have data structures that store data similar to LINs and may provide capabilities similar to LINs as described herein. It can be appreciated that the concepts and implementations as provided herein are functional using data structures not termed LINs or inodes but that offer the same functionality to the file system.

In some distributed file systems, specifically those that use distributed locking of files and metadata structures to process operations, each node may coordinate a small subset of the overall number of locks on the cluster of nodes. If one node then wishes to assert a lock on a file or structure that is coordinated by another node, the node must send a communication packet to the coordinator node that asks for the lock to be established and then receive confirmation from the coordinator when the request been granted. It can be appreciated that in large scale distributed file system, that the number of locks that are managed in this manner can reach tens to hundreds of million.

When a node or group of nodes is added to a cluster of nodes, or when a node or nodes is removed from a cluster of nodes, the resources of the cluster can change dramatically. In the even where a node leaves the cluster, any locks that were previously coordinated by that node must be redistributed, e.g., a coordinator assigned among the surviving nodes. When a node has become the new coordinator for a lock or a group of locks, at first, it will have minimal knowledge about which other nodes, e.g. initiator nodes, have locks asserted on the structures the coordinator node is coordinating. Thus, the coordinator must either ask, and wait passively and receive, updates from all initiators nodes that effectively reassert there locks. With potentially millions of locks to assert, the amount of backplane communication among the cluster can be substantial. It can be further appreciated that the during the lock reconstruction process after a group change, the entire distributed file system is locked down until the group change process is complete, suspending any pending operations and likely penalizing performance to any clients connected to the distributed file system.

Implementations are provided herein for an efficient reconstruction of distributed lock states during a group change within a distributed file system. When a node leaves or joins the cluster, a consistent hash can be used in reassigning the coordinator node to all the distributed locks throughout the file system. Through the use of the consistent hash, wherever possible, nodes that exist both prior to and after the group change can maintain their coordinator status for the locks they manage. If the node is aware they are maintaining coordinator status for the locks it manages, it can retain the locking status previously associated with the locks it was coordinating prior to the group change, thus reducing necessary backplane communication from a coordinator change, and increasing the efficiency for the group change process.

Figure 6:
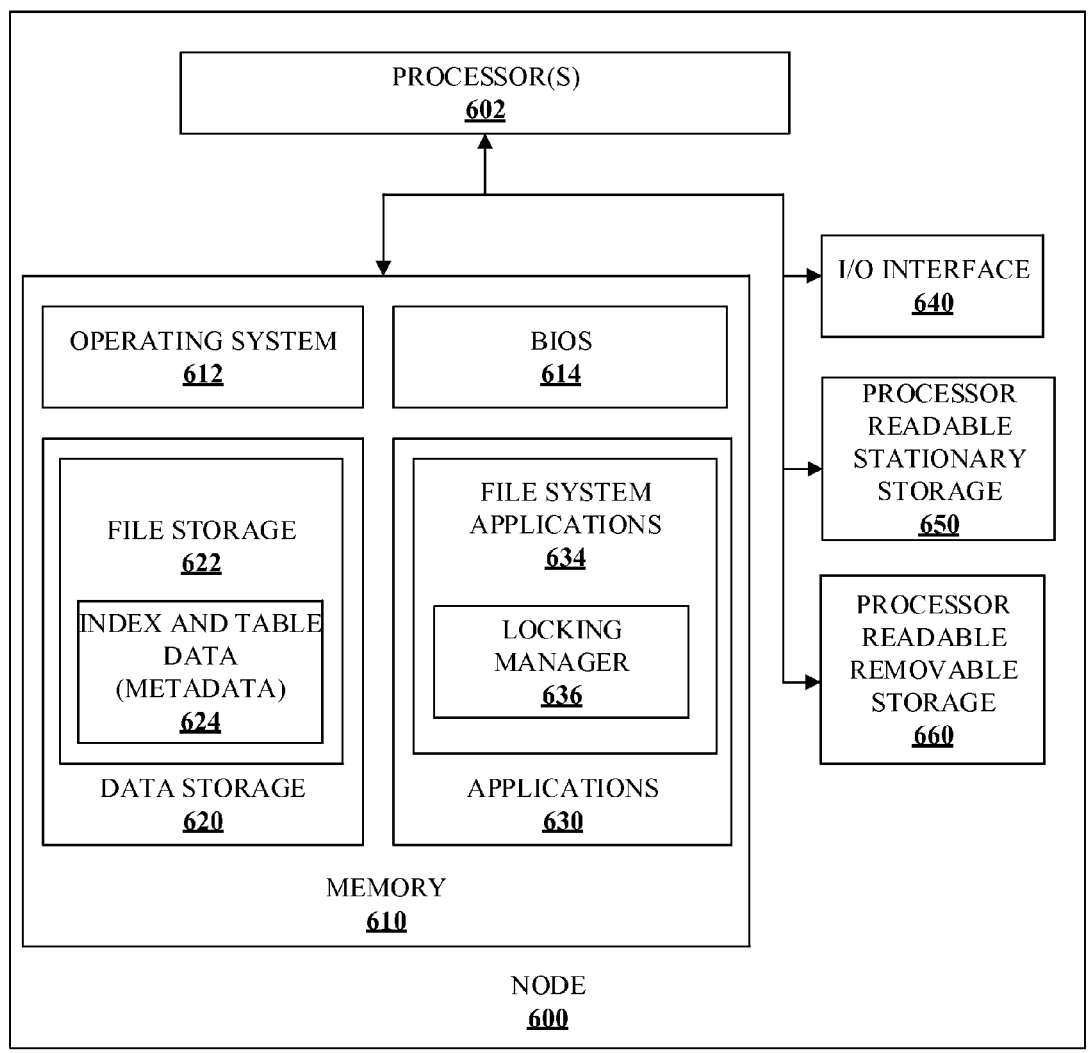
FIG. 6 illustrates an example block diagram of a node in accordance with implementations of this disclosure.

Referring now to FIG. 1, there is illustrated an example partial block diagram of a cluster of nodes and associated clients in accordance with implementations of this disclosure. It can be appreciated that not all the components associated with a node are depicted in FIG. 1. FIG. 6, as described in greater detail below, provides a more detailed examination of the components within an example node.

In some distributed file systems, clients can connect to a cluster of nodes by establishing a connection with one of the nodes. Thus each node in a file system, for example, Node 1, Node 2, Node 3, and Node "N" (where "N" is a positive integer greater than 3) as depicted in FIG. 1 can accept a connection from a client. Each node can maintain a copy of a distributed lock hash table or set of distributed lock hash tables. In one implementation, the copies can be synchronized across all nodes so that each node has an identical copy of the distributed lock hash tables. For example, in one implementation, there can be 16 Million LIN locks available, 16 Million reference locks, 4 Million Mirrored Data Structure ("MDS") (e.g., metadata data structures) locks, plus thousands of other locks related to operations of the file system.

In one example, Client 1 is connected to Node 1 and submits an operation to be performed that involves establishing a LIN lock. Node 1 can look up the LIN lock in the distributed lock hash table and determine what Node is the coordinator for that LIN lock. If Node 1 is the coordinator, no backplane communication is necessary and Node 1 can work with the coordinator lock component to establish the requested LIN lock. It can be appreciated that process for establishing a lock, processing locking conflicts, waiting for existing locks to resolve, etc. may require communication with other nodes. For example, continuing the previous example, if Client 2 had previously requested a LIN lock on the same LIN that Client 1 is now requesting, and Node 3 first looked up in its copy of the distributed lock hash tables that Node 1 was the coordinator for the LIN, then Node 3's initiator lock component had made a backplane communication with Node 1 to establish the lock.

In the event of a group change, for example, Node 3 leaving the cluster of Nodes due to a loss of communication with the cluster communication backplane, or in another example, an additional Node being added to the cluster to expand storage capacity, it will be necessary to recreate the distributed lock hash tables that account for the change in resources. Continuing the example where Node 3 is lost to the cluster due to a loss of communication, at a minimum, any locks previously coordinated by Node 3 will have to be reassigned to surviving nodes so that at least one node is the coordinator for each lock. Previous to the present disclosure, a hash was generated based on resources that exist after the group change, and all locks of the cluster were reassigned. In some cases, the coordinator node would remain the same; however, in many cases, the coordinator node would change, even if the previous coordinator node was not added or removed as a part of the group change. This is because in most traditional hash tables, a change in the number of resources available causes nearly all keys (e.g., locks) to be remapped. Thus, after a group change, and after the distributed lock hash tables were recreated, each initiator node had to assert its locks to the assigned coordinator by exchanging data packets over the cluster communications backplane. Furthermore, until all the surviving nodes had reasserted their locks to the new coordinators, the cluster was locked down exclusively for the group change process, and any pending operations were put on hold until after all the locks were reestablished.

In one implementation, a consistent hash can be used to resize the distributed lock hash tables after a group change. In one implementation, the hashing algorithm to be used can be described as "any/up." In an any/up approach, the first attempt is made to hash locks to a hash table that assumes that all nodes in the cluster of nodes are currently available as resources. If you hash a lock to a node that is known to be down, then you rehash that lock on a hash table that only includes nodes that are available. It can be appreciated that by first attempting to hash the lock to nodes that assume are available, the previous hashing state of the lock is likely to be maintained unless it gets hashed to a node that is no longer available, then it will be rehashed to a node known to be available. In this sense, the previous hash assignments are maintained wherever possible. In other implementations, hashing algorithms such as chord and straw bucket can be used.

It can be appreciated that the locking states maintained by a coordinator node for a lock include all locks asserted by other initiator nodes of the cluster that are still pending. For example several nodes can have shared locks established contemporaneously. Nodes can have coexisting delta read and delta write locks as well. The coordinator node maintains the pending locks asserted by all initiator nodes for a resource. If a new coordinator is assigned for a resource, that coordinator must receive messages from all initiators that have a pending lock on the resource to recreate the locking state of the resource after the group change.

FIGS. 2A-2C illustrate example bar graphs of cluster resources associated with a cluster of nodes before and after a group change in accordance with implementations of this disclosure. FIG. 2A illustrates a four node cluster prior to a group change. As illustrated, the size of each node is directly proportional to the resources of the node. While this is abstract for ease of understanding, it can be appreciated that there is not one single resource but multiple resources that can be assessed for each node. For example, nodes can have varying storage space capacity, varying amount of processor resources, varying amounts of cache memory and system memory resources, etc. Thus, it can be appreciated that some nodes may be configured to handle greater responsibility in coordinating locks, e.g., coordinate more locks than nodes with less resources. In one implementation, hardware profiles can be established for the varying types of nodes a distributed storage system supports. In another implementation, resources can be dynamically assessed in real time by a monitoring component on the node, that can account for changed conditions such as drive failure, processor failure, storage capacity additions, etc. It can be appreciated that resource assessment for nodes can occur as a part of the group change process prior to rehashing locks to coordinators.

FIG. 2B illustrates an example bar graph of node resources after a group change occurs that adds a node. As shown, Node 5 has been added to the original cluster as shown in FIG. 2A. By using a consistent hash as described above with respect to FIG. 1, the addition of a new node, Node 5, won't necessarily change the existing coordinator assignments throughout the cluster. Instead, coordinator assignments can be assigned to Node 5 as needed while existing coordinator nodes can remain static. For example, if Node 1, the node with most amount of resources as depicted in FIG. 2B, becomes overburdened with node activity that is slowing down or preventing its ability to operate as a coordinator node for all it locking assignments, some of them can be released and reassigned to Node 5 when needed.

FIG. 2C illustrates an example bar graph of node resources after a group change occurs that removes a node. As shown, Node 3 has been removed from the original cluster as shown in FIG. 2A. During the group change process, in one implementation, using the any/up hash as described above, nodes previously acting as coordinators for locks will likely remain as coordinator, as first the any/up algorithm would assume all nodes from FIG. 2A are available, and if the lock is assigned to Nodes 1, 2, or 4 as a coordinator, they would assigned to nodes that are "up" or active and remain the same. However, when a lock previously coordinated by Node 3 can no longer remain assigned to Node 3 and Node 3 is no longer up, it can be rehashed to one of the remaining nodes in the cluster based on the amount of resources available, meaning that that more keys, e.g., locks, would be assigned to be coordinated by Node 1 than Node 2, and more keys would be assigned to Node 2 than Node 4, etc.

While maintaining the coordinator status of a node after a group change wherever possible can help to minimize cluster network traffic necessary to reassert locks and minimize the time a cluster is unresponsive to other operations during a group change, there are also a series of steps that can be taken during a group change to prevent pending operations from being abandoned, ignored, lost, etc. during the group change.

Figure 3:
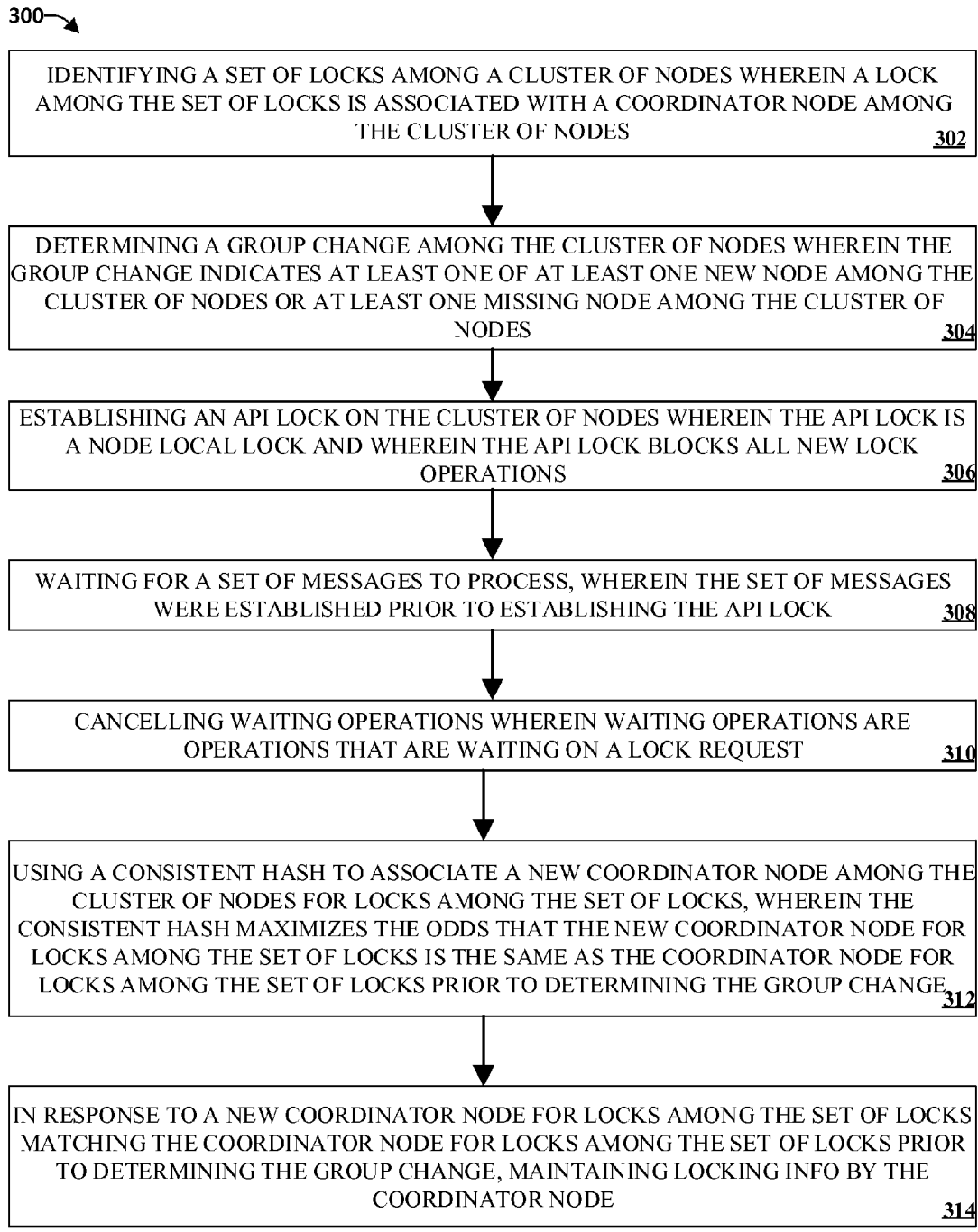
FIG. 3 illustrates an example method for processing a group change on a distributed locking file system using a consistent hash in accordance with implementations of this disclosure.
Figure 4:
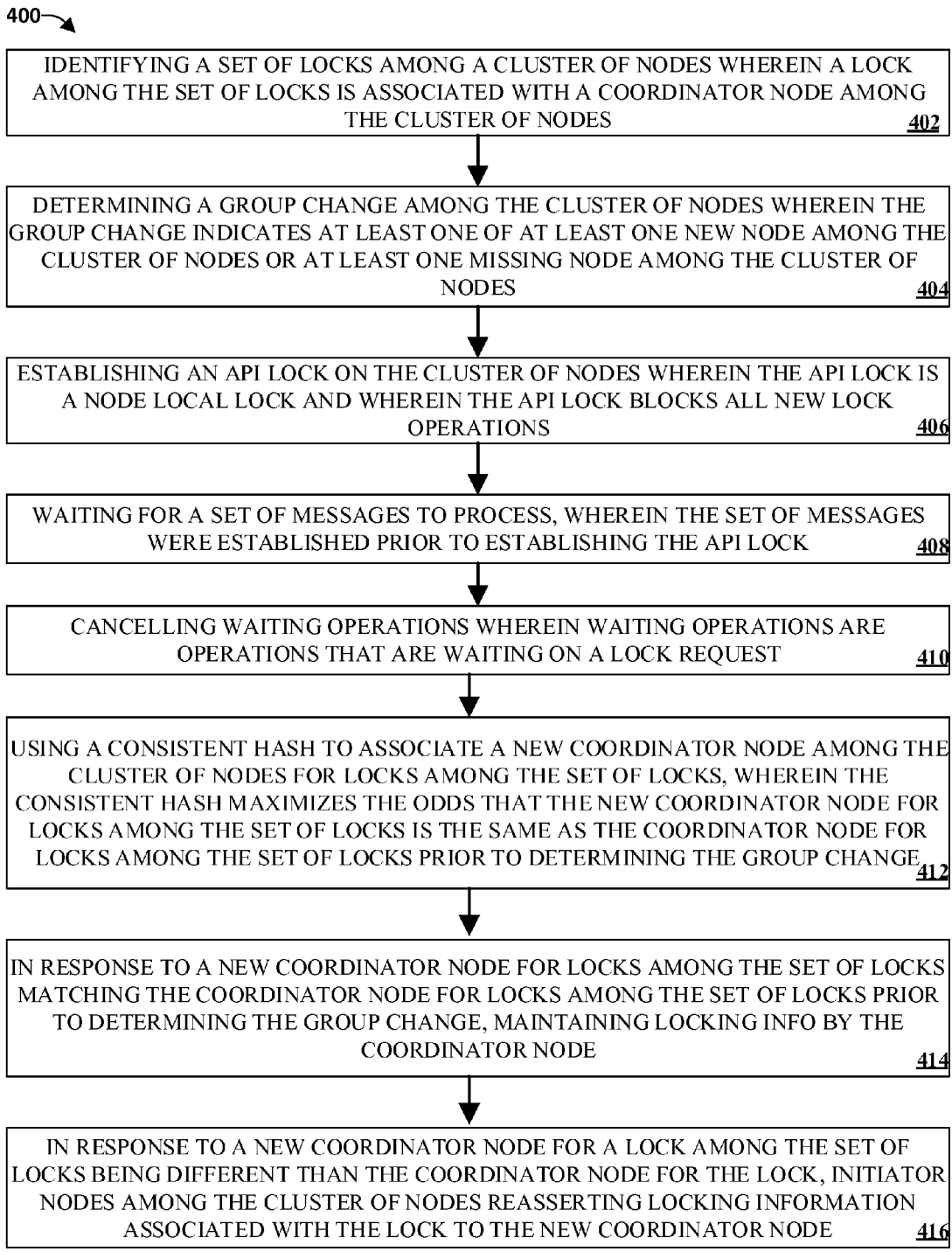
FIG. 4 illustrates an example method for processing a group change on a distributed locking file system using a consistent hash including a changed coordinator node in accordance with implementations of this disclosure.

FIGS. 3-4 illustrate methods and/or flow diagrams in accordance with this disclosure. For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Moreover, various acts have been described in detail above in connection with respective system diagrams. It is to be appreciated that the detailed description of such acts in the prior figures can be and are intended to be implementable in accordance with one or more of the following methods.

FIG. 3 illustrates an example method for processing a group change on a distributed locking file system using a consistent hash in accordance with implementations of this disclosure. At 302, a set of locks among a cluster of nodes can be identified, wherein a lock among the set of locks is associated with a coordinator node among the cluster of nodes.

At 304, a group change among the cluster of nodes can be determined, wherein the group change indicates at least one of at least one new node among the cluster of nodes or at least one missing node among the cluster of nodes.

At 306, an API lock can be established on the cluster of nodes, wherein the API lock is a node local lock and wherein the API lock blocks all new lock operations. For example, once an API locks is established, any process that requires the establishing of a lock, or a known state of a lock to be continue processing, is put on hold until the API lock is removed. It can be appreciated that some processes may have begun prior to the API lock being asserted, but having no yet been fully processed. In one implementation, the method can pause until it can be confirmed that every node in the cluster of nodes has established an API lock prior to proceeding to step 308.

At 308, a set of messages can be waited on to process, wherein the set of messages were established prior to establishing the API lock. For example, if a request came in a CPU cycle or more prior to the API lock, the request will be processed, and we'll wait for it to complete prior to proceeding. In one implementation, the method can pause until it can be confirmed that every node in the cluster of nodes has waited until all pending messages received prior to the node API lock being established are processed prior to proceeding to step 310.

At 310, waiting operations can be cancelled, wherein waiting operations are operations that are waiting on a lock request. For example, if an outstanding operations is waiting to be processed but cannot process until the API lock established at step 306 is removed from the node, the process may be deemed a waiter, and the process can be cancelled. It can be appreciated that a cancelled process can be moved to a stable state where it can be put on hold until the group change process finishes in its entirety. For example, a micro-operation can be cancelled, and the macro-operation can remain in a holding state, wherein the cancelled micro-operation begins anew when the macro-operation is able to restart after the group change process completes. It can be appreciated that by cancelling a process and placing in a wait mode, the amount of activity that nodes need to process during a group change can be reduced opening more resources to effectuate the group change as fast as possible. In one implementation, the method can pause until it can be confirmed that every node in the cluster of nodes has cancelled all waiting operations prior to proceeding to step 312.

At 312, a consistent hash can be used to associated a new coordinator node among the cluster of nodes for locks among the set of locks, wherein the consistent hash maximizes the odds that the new coordinator node for locks among the set of locks is the same as the coordinator node for locks among the set of locks prior to determining the group change. In one implementation, the consistent hash used can further distribute locks based on an amount of resources associated with nodes among the cluster of nodes.

At 314, in response to a new coordinator node for locks among the se of locks matching the coordinator node for locks among the set of locks prior to determining the group change, the lock data previously maintained by the coordinator node can be retained. For example, if the coordinator is maintained, the coordinator will already have a copy in memory of the asserted locks for the resource prior to the group change process starting, and that copy will be accurate after the group change process, so maintaining the existing locking information associated with the resource will not require any backplane communication by initiators to reassert locks on the resource the coordinator node is coordinating.

FIG. 4 illustrates an example method for processing a group change on a distributed locking file system using a consistent hash including a changed coordinator node in accordance with implementations of this disclosure. Step 402-414 are identical to steps 302-314 as described above with respect to FIG. 3. At 416, in response to a new coordinator node for al ock among the set of locks being different than the coordinator node for the lock, initiator nodes among the cluster of nodes can reassert locking information associated with the lock to the new coordinator node. For example, in a group change where a node is lost from the cluster of nodes, any nodes resources previously assigned to the lost node as the coordinator node will have to be reassigned to a new coordinator node as maintaining the coordinator node through the group change will not be possible. Thus, each initiator nodes in the cluster of nodes will reassert their locking states associated with the resource to the new coordinator node.

Figure 5:
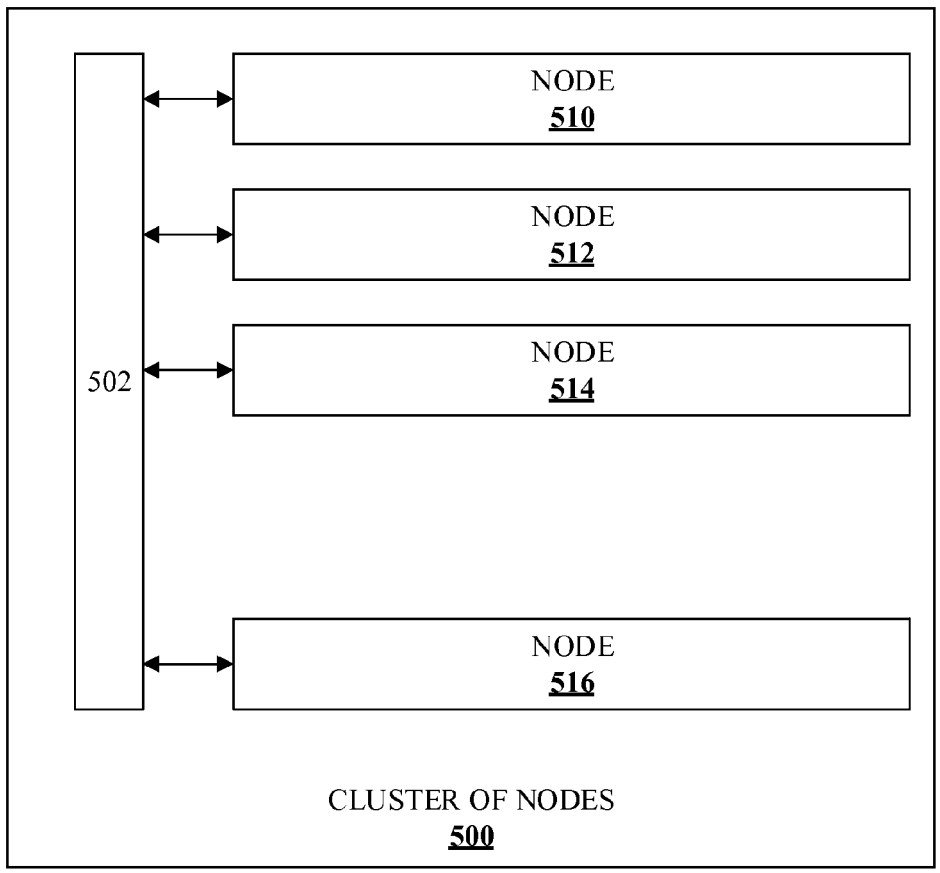
FIG. 5 illustrates an example block diagram of a cluster of nodes in accordance with implementations of this disclosure.

FIG. 5 illustrates an example block diagram of a cluster of nodes in accordance with implementations of this disclosure. However, the components shown are sufficient to disclose an illustrative implementation. Generally, a node is a computing device with a modular design optimized to minimize the use of physical space and energy. A node can include processors, power blocks, cooling apparatus, network interfaces, input/output interfaces, etc. Although not shown, cluster of nodes typically includes several computers that merely require a network connection and a power cord connection to operate. Each node computer often includes redundant components for power and interfaces. The cluster of nodes 500 as depicted shows Nodes 510, 512, 514 and 516 operating in a cluster; however, it can be appreciated that more or less nodes can make up a cluster. It can be further appreciated that nodes among the cluster of nodes do not have to be in a same enclosure as shown for ease of explanation in FIG. 5, and be geographically disparate. Backplane 502 can be any type of commercially available networking infrastructure that allows nodes among the cluster of nodes to communicate amongst each other in as close to real time as the networking infrastructure allows. It can be appreciated that the backplane 502 can also have a separate power supply, logic, I/O, etc. as necessary to support communication amongst nodes of the cluster of nodes.

It can be appreciated that the Cluster of Nodes 500 can be in communication with a second Cluster of Nodes and work in conjunction to provide a distributed file system. Nodes can refer to a physical enclosure with a varying amount of CPU cores, random access memory, flash drive storage, magnetic drive storage, etc. For example, a single Node could contain, in one example, 36 disk drive bays with attached disk storage in each bay. It can be appreciated that nodes within the cluster of nodes can have varying configurations and need not be uniform.

FIG. 6 illustrates an example block diagram of a node 600 in accordance with implementations of this disclosure.

Node 600 includes processor 602 which communicates with memory 610 via a bus. Node 600 also includes input/output interface 640, processor-readable stationary storage device(s) 650, and processor-readable removable storage device(s) 660. Input/output interface 640 can enable node 600 to communicate with other nodes, mobile devices, network devices, and the like. Processor-readable stationary storage device 650 may include one or more devices such as an electromagnetic storage device (hard disk), solid state hard disk (SSD), hybrid of both an SSD and a hard disk, and the like. In some configurations, a node may include many storage devices. Also, processor-readable removable storage device 660 enables processor 602 to read non-transitive storage media for storing and accessing processor-readable instructions, modules, data structures, and other forms of data. The non-transitive storage media may include Flash drives, tape media, floppy media, disc media, and the like.

Memory 610 may include Random Access Memory (RAM), Read-Only Memory (ROM), hybrid of RAM and ROM, and the like. As shown, memory 610 includes operating system 612 and basic input/output system (BIOS) 614 for enabling the operation of node 600. In various embodiments, a general-purpose operating system may be employed such as a version of UNIX, LINUX™, a specialized server operating system such as Microsoft's Windows Server™ and Apple Computer's IoS Server™, or the like.

Applications 630 may include processor executable instructions which, when executed by node 600, transmit, receive, and/or otherwise process messages, audio, video, and enable communication with other networked computing devices. Examples of application programs include database servers, file servers, calendars, transcoders, and so forth. Applications 630 may include, for example, file system applications 634, and cursor applications 636 according to implementations of this disclosure. It can be appreciated that cursor application 636 can store information in memory 610 such as in a cache or the like for use during restripe operations as discussed supra.

Human interface components (not pictured), may be remotely associated with node 600, which can enable remote input to and/or output from node 600. For example, information to a display or from a keyboard can be routed through the input/output interface 640 to appropriate peripheral human interface components that are remotely located. Examples of peripheral human interface components include, but are not limited to, an audio interface, a display, keypad, pointing device, touch interface, and the like.

Data storage 620 may reside within memory 610 as well, storing file storage 622 data such as metadata or LIN data. It can be appreciated that LIN data and/or metadata can relate to rile storage within processor readable stationary storage 650 and/or processor readable removable storage 660. For example, LIN data may be cached in memory 610 for faster or more efficient frequent access versus being stored within processor readable stationary storage 650. In addition, Data storage 620 can also host index and table data 624 such as cursor data in accordance with implementations of this disclosure. Index and table data can be stored as files in file storage 622.

In at least one of the various embodiments, a file may be referenced by an inode that may contain file meta-data, including references, and/or pointers to the file's data blocks. In at least one of the various embodiments, if writers want to write to a file they may need to obtain a lock on the inode to prevent other writers from changing the contents of the inode while a writer is in the middle of a write transaction. In at least one of the various embodiments, the file may be distributed among one or more data storage servers in a distributed data cluster.

In at least one of the various embodiments, a lock manager 636 may be arranged to coordinate the locking protocol between writers or readers and file resources, including the inodes and file data. The locking manager 636 can include the coordinating locking component and initiator locking component as described above with respect to FIG. 1. In addition, the distributed lock hash tables can be stored within index and table data 624 in-memory or in processor readable stationary storage 650 or removable storage 660. A lock manager may be part of an operating system 612 or file system. In at least one of the various embodiments, a lock manager manages lock contention among distributed writers or readers within and among distributed nodes of a data cluster. In at least one of the various embodiments, writers or readers of files access the information in an inode by using file system calls, operating system calls, API's, or the like. In at least one of the various embodiments, locking rules may be enforced by a lock manager. A lock manager may enforce the lock rules across a file system that may be implemented on one or more computing devices. A file system may be distributed among multiple data storage nodes and compute nodes.

Also, individual files may be distributed across one or more nodes that may be arranged in a cluster. However, in at least one of the various embodiments, there may be a single logical inode for each file that may be required to maintain file system consistency. In at least one of the various embodiments, a locking manager may control access to inodes based on a locking protocol that may include delta read locks and delta write locks. For example, in at least one of the various embodiments, multiple writers or readers across multiple data storage nodes may be concurrently contending for access to files that likewise may be stored across multiple data storage nodes. A locking manager may be arranged to enforce the locking protocol and guarantee that the inode of the distributed file data remains consistent. Locking managers may also be responsible for ensuring that delta writes that may have been recorded as journal deltas may be reconciled and resolved if required, such as if a preparing to grant a process a shared or exclusive lock.

The illustrated aspects of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not all of which may be explicitly illustrated herein.

What has been described above includes examples of the implementations of the present disclosure. It is, of course, not possible to describe every conceivable combination of components or methods for purposes of describing the claimed subject matter, but many further combinations and permutations of the subject innovation are possible. Accordingly, the claimed subject matter is intended to embrace all such alterations, modifications, and variations that fall within the spirit and scope of the appended claims. Moreover, the above description of illustrated implementations of this disclosure, including what is described in the Abstract, is not intended to be exhaustive or to limit the disclosed implementations to the precise forms disclosed. While specific implementations and examples are described herein for illustrative purposes, various modifications are possible that are considered within the scope of such implementations and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

What is claimed is:

1. A method comprising:
identifying a set of locks among a cluster of nodes operating as a distributed file system wherein a lock among the set of locks is associated with a coordinator node among the cluster of nodes;
determining a group change among the cluster of nodes wherein the group change indicates at least one of at least one new node among the cluster of nodes or at least one missing node among the cluster of nodes;
establishing an operation lock on the cluster of nodes wherein the operation lock is a node local lock and wherein the operation lock blocks all new lock operations;
waiting for a set of messages to process, wherein the set of messages were established prior to establishing the operation lock;
cancelling waiting operations wherein waiting operations are operations that are waiting on a lock request;
using a consistent hash to associate a new coordinator node among the cluster of nodes for locks among the set of locks, wherein the consistent hash prioritizes that the new coordinator node for locks among the set of locks is the same as the coordinator node for locks among the set of locks prior to determining the group change; and
in response to a new coordinator node for locks among the set of locks matching the coordinator node for locks among the set of locks prior to determining the group change, maintaining locking info by the coordinator node.

2. The method of claim 1, further comprising:
in response to a new coordinator node for a lock among the set of locks being different than the coordinator node for the lock, initiator nodes among the cluster of nodes reasserting locking information associated with the lock to the new coordinator node.

3. The method of claim 1, wherein the set of messages are distributed throughout the cluster of nodes and wherein the waiting for the set of messages to process includes waiting for each node among the cluster of nodes to process any distributed set of messages.

4. The method of claim 1, wherein the waiting operations are distributed throughout the cluster of nodes and wherein the cancelling waiting operations includes waiting for each node among the cluster of nodes to cancel any distributed waiting operations.

5. The method of claim 1, wherein the consistent hash further distributes locks based on an amount of resources associated with nodes among the cluster of nodes.

6. A system comprising at least one storage device and at least one hardware processor configured to:
identify a set of locks among a cluster of nodes operating as a distributed file system wherein a lock among the set of locks is associated with a coordinator node among the cluster of nodes;
determine a group change among the cluster of nodes wherein the group change indicates at least one of at least one new node among the cluster of nodes or at least one missing node among the cluster of nodes;
establish an operation lock on the cluster of nodes wherein the operation lock is a node local lock and wherein the operation lock blocks all new lock operations;
wait for a set of messages to process, wherein the set of messages were established prior to establishing the operation lock;
cancel waiting operations wherein waiting operations are operations that are waiting on a lock request;
use a consistent hash to associate a new coordinator node among the cluster of nodes for locks among the set of locks, wherein the consistent hash maximizes the odds that the new coordinator node for locks among the set of locks is the same as the coordinator node for locks among the set of locks prior to determining the group change; and
in response to a new coordinator node for locks among the set of locks matching the coordinator node for locks among the set of locks prior to determining the group change, maintain locking info by the coordinator node.

7. The system of claim 6, further configured to:
in response to a new coordinator node for a lock among the set of locks being different than the coordinator node for the lock, initiator nodes among the cluster of nodes reassert locking information associated with the lock to the new coordinator node.

8. The system of claim 6, wherein the set of messages are distributed throughout the cluster of nodes and wherein the waiting for the set of messages to process includes waiting for each node among the cluster of nodes to process any distributed set of messages.

9. The system of claim 6, wherein the waiting operations are distributed throughout the cluster of nodes and wherein the cancelling waiting operations includes waiting for each node among the cluster of nodes to cancel any distributed waiting operations.

10. The system of claim 6, wherein the consistent hash further distributes locks based on an amount of resources associated with nodes among the cluster of nodes.

11. A non-transitory computer readable medium with program instructions stored thereon to perform the following acts:
identifying a set of locks among a cluster of nodes operating as a distributed file system wherein a lock among the set of locks is associated with a coordinator node among the cluster of nodes;
determining a group change among the cluster of nodes wherein the group change indicates at least one of at least one new node among the cluster of nodes or at least one missing node among the cluster of nodes;
establishing an operation lock on the cluster of nodes wherein the operation lock is a node local lock and wherein the operation lock blocks all new lock operations;
waiting for a set of messages to process, wherein the set of messages were established prior to establishing the operation lock;
cancelling waiting operations wherein waiting operations are operations that are waiting on a lock request;
using a consistent hash to associate a new coordinator node among the cluster of nodes for locks among the set of locks, wherein the consistent hash maximizes the odds that the new coordinator node for locks among the set of locks is the same as the coordinator node for locks among the set of locks prior to determining the group change; and in response to a new coordinator node for locks among the set of locks matching the coordinator node for locks among the set of locks prior to determining the group change, maintaining locking info by the coordinator node.

12. The non-transitory computer readable medium of claim 11, with program instructions stored thereon to further perform the following acts:

in response to a new coordinator node for a lock among the set of locks being different than the coordinator node for the lock, initiator nodes among the cluster of nodes reasserting locking information associated with the lock to the new coordinator node.

13. The non-transitory computer readable medium of claim 11, wherein the set of messages are distributed throughout the cluster of nodes and wherein the waiting for the set of messages to process includes waiting for each node among the cluster of nodes to process any distributed set of messages.

14. The non-transitory computer readable medium of claim 11, wherein the waiting operations are distributed throughout the cluster of nodes and wherein the cancelling waiting operations includes waiting for each node among the cluster of nodes to cancel any distributed waiting operations.

15. The non-transitory computer readable medium of claim 11, wherein the consistent hash further distributes locks based on an amount of resources associated with nodes among the cluster of nodes.

* * * * *